United States Patent
O'Neill et al.

(10) Patent No.: US 7,243,162 B2
(45) Date of Patent: Jul. 10, 2007

(54) PROCESSING NETWORK COMMUNICATION CONTROL MESSAGES

(75) Inventors: Alan W O'Neill, Ipswich (GB); Philip M Clarke, Ipswich (GB); Paul J Felton, Ipswich (GB); Caroline M O Beauchamps, Hertfordshire (GB); Shaun S Baker, Zurich (CH)

(73) Assignee: British Telecommunications public limited company, London (GB)

( * ) Notice: Subject to any disclaimer, the term of this patent is extended or adjusted under 35 U.S.C. 154(b) by 487 days.

(21) Appl. No.: 10/220,498

(22) PCT Filed: Mar. 26, 2001

(86) PCT No.: PCT/GB01/01343

§ 371 (c)(1),
(2), (4) Date: Aug. 30, 2002

(87) PCT Pub. No.: WO01/74030

PCT Pub. Date: Oct. 4, 2001

(65) Prior Publication Data

US 2003/0046404 A1    Mar. 6, 2003

(30) Foreign Application Priority Data

Mar. 24, 2000  (EP) ................................ 00302424

(51) Int. Cl.
G06F 15/16 (2006.01)

(52) U.S. Cl. ..................... 709/245; 709/230; 709/228

(58) Field of Classification Search ................ 709/245, 709/249, 227–228, 230
See application file for complete search history.

(56) References Cited

U.S. PATENT DOCUMENTS

| 6,577,622 B1 * | 6/2003 | Schuster et al. ............ 370/352 |
| 6,678,735 B1 * | 1/2004 | Orton et al. ................ 709/230 |
| 6,735,621 B1 * | 5/2004 | Yoakum et al. ............. 709/218 |
| 2001/0028654 A1 * | 10/2001 | Anjum et al. ............... 370/401 |
| 2003/0110292 A1 * | 6/2003 | Takeda et al. .............. 709/245 |

FOREIGN PATENT DOCUMENTS

| EP | 0458717 A2 | 11/1991 |
| EP | 0462725 A2 | 12/1991 |
| WO | WO 97/27546 | 7/1997 |
| WO | WO 99/27460 | 6/1999 |

OTHER PUBLICATIONS

Klensin, "Simple Mail Transfer Protocol", Internet Draft draft-ietf-drums-smtpupd-10.txt, Feb. 1999.

(Continued)

Primary Examiner—Abdullahi Salad
(74) Attorney, Agent, or Firm—Nixon & Vanderhye P.C.

(57) ABSTRACT

Control messages constructed in accordance with a first communications protocol for use in a communications network each include a first address identifier having a format defined by the first protocol. The control message is processed to derive a second address identifier having a format defined by a second communications protocol. The control message is re-formatted for transmission, in accordance with the second protocol, to a network system associated with the second address identifier.

14 Claims, 6 Drawing Sheets

OTHER PUBLICATIONS

Wireless Application Protocol Forum Ltd., "WAP Push Architectural Overview", Version 08, Nov. 1999.

Roach et al, "Event Notification in SIP", Internet Draft, 'Online', Mar. 2000, XP002179315.

Handley et al, "RFC 2543 SIP: Session Initiation Protocol", Request for Comments, Mar. 1999, XP002173547.

Schulzrinne, "A Comprehensive Multimedis Control Architecture for the Internet", Proceedings of the IEEE International Workshop on Network and Operating Systems Support for Digital Audio and Video, May 19, 1997, XP002079407.

Schulzrinne et al, "Signaling for Internet Telephony", Columbia Univ. Dept. of Computer Science Technical Report CUCS-005-98, 'Online! Feb. 1998, XP002145100.

Tang et al, "A Gateway Between MHS (X.400) and SMTP", Proceedings of the Computer Standards Conference, (Compstan), US, Washington, IEEE Comp. Soc. Press, vol. Conf. 2, Mar. 21, 1988, ISBN: 0-8186-0791-2.

Schulzrinne et al, "Internet Telephony: Architecture and Protocols—an IETF Perspective" Computer Networks and ISDN Systems, NL, North Holland Publishing, Amsterdam, vol. 31, No. 3, Feb. 11, 1999, pp. 237-255, XP000700321.

* cited by examiner

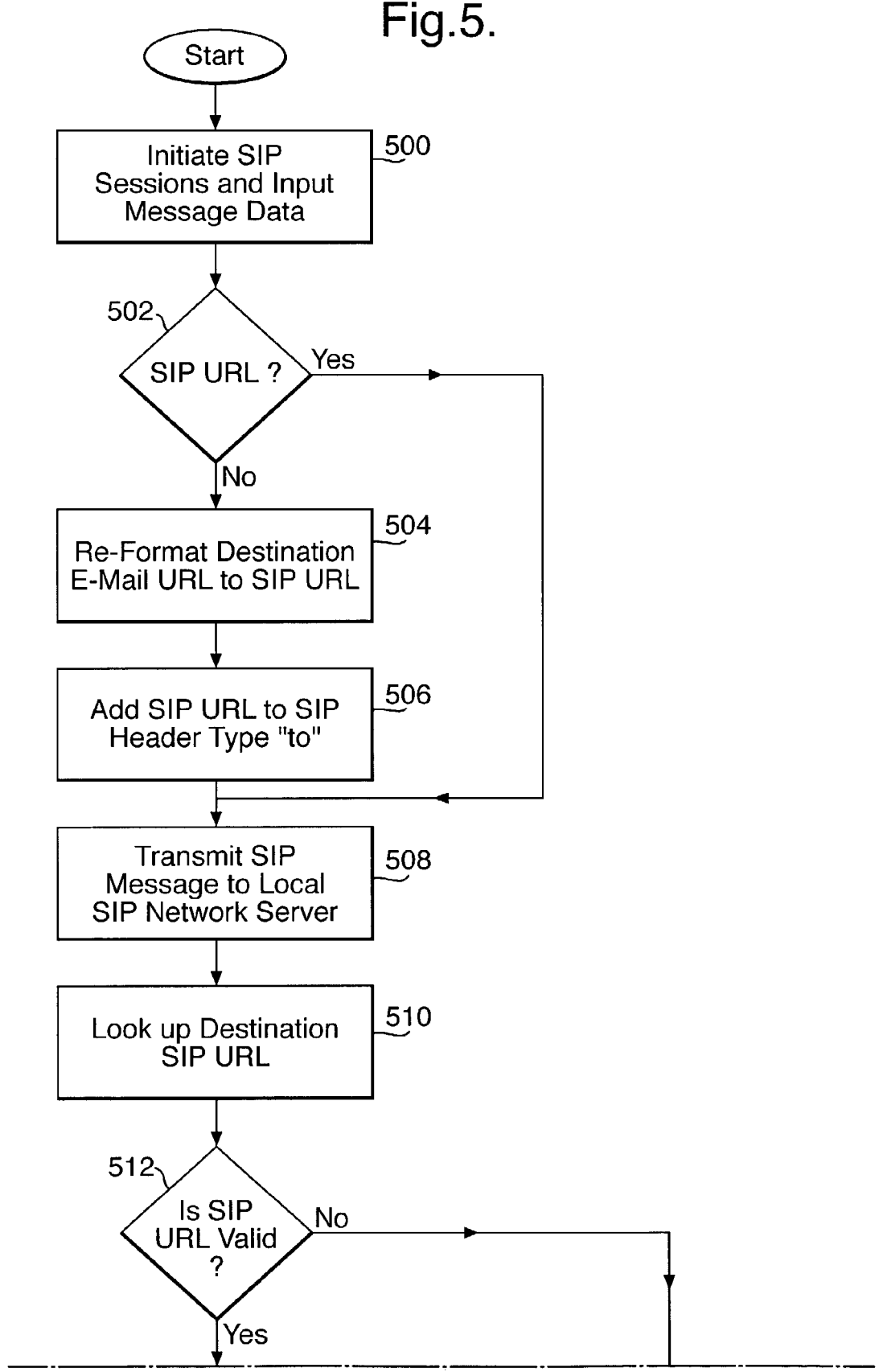

PROCESSING NETWORK COMMUNICATION CONTROL MESSAGES

This application is the US national phase of international application PCT/GB01/01343 filed 26 Mar. 2001 which designated the U.S.

BACKGROUND

1. Technical Field

This invention relates to processing control messages for use in communications network, and in particular to a method, data processing system and software application program for processing control messages constructed in accordance with communications control protocol. The invention is particularly, but not exclusively, direct to text-based application-layer communication control protocol.

2. Related Art

The Session Initiation Protocol (SIP) is an application-layer control protocol for creating, modifying and terminating sessions having one or more participants. These sessions include Internet multimedia conferences, Internet telephone calls and multimedia distribution. Members in a session can communicate via multicast or via a mesh of unicast relations, or a combination of these. SIP supports session descriptions that allow participants to agree on a set of compatible media types. It also supports user mobility by proxying and redirecting requests to the user's current location. SIP is not tied to any particular conference control protocol. There is widespread interest in the protocol, especially for telephony-related applications. SIP was proposed by the Internet Engineering Task Force (IETF) group and is now a proposed standard published as RFC 2543.

The entities used in SIP are user agents, proxy servers, redirect servers and location servers. A SIP user agent is an end-system that allows a user to participate in a session. A SIP user agent contains both a user agent client and a user agent server. A user agent client is used to initiate a session and a user agent server is used to respond to request from a user agent client. A user is addressed using an email-like address identifier "user@host", where "user" is a user name or phone number and "host" is a domain name or numerical Internet Protocol (IP) address. SIP defines a number of request types, in particular INVITE, ACK, BYE, OPTIONS, CANCEL, and REGISTER. Responses to SIP messages indicate success or failure, distinguished by status codes, 1xx (100 to 199) for progress updates, 2xx for success 3xx for redirection, and higher numbers for failure. Each new SIP transaction has a unique call identifier (call ID), which identifies the session. If the session needs to be modified, e.g., for adding another media, the same call identifier is used in the initial request, in order to indicate that this is a modification of an existing session.

The SIP user agent has two basic functions: listening for incoming SIP messages, and sending SIP messages upon user actions or incoming messages. The SIP user agent typically also starts appropriate applications according to the session that has been established. The SIP proxy server relays SIP messages, so that it is possible to use a domain name to find a user, for example using the Domain Name System (DNS) rather than knowing the IP address or name of the host. A SIP proxy can thereby also be used to hide the location of the user. A redirect server returns the location of the host rather than relaying the SIP message. Both redirect and proxy servers accept registrations from users, in which the current location of the user is given. The user's location can be stored at a dedicated location server.

SIP is typically implemented by transmitting Internet Protocol (IP) packets. SIP is independent of the packet layer and only requires an unreliable datagram service, as it provides its own reliability mechanism. While SIP typically is used over UDP or TCP, it could be used over frame relay, ATM AAL5 or X.25.

SIP is a text based protocol and is based to a certain extent (in terms of syntax) on the HTTP protocol. A typical message consists of a single request line, a number of header lines and a message body.

The request line indicates the type of the messages, the message destination and the SIP version it complies with. The following is a typical example:

INVITE sip:Richard@bt.com SIP/2.0

A header line contains the name of the header type, followed by a semicolon and the contents as these are defined for the specific header. Consequently, each header type is used for a specific purpose (either to indicate some parameters or to issue a request). The following are typical examples:

From: sip:Richard@bt.com
To: sip:Steve@bt.com
Subject: Official meeting

The message body may be of any content, although it usually has contents formatted in accordance with the Session Description Protocol (SDP).

SIP URL address identifiers such as sip:Richard@bt.com are required for the exchange of SIP messages in a similar way that e-mail URL address identifiers are required for the exchange of electronic mail.

By using an e-mail type address it is possible to deliver a SIP message to a SIP server that knows the location of the user or user agent server the message is intended for. The IP address of the SIP server having authority for the callee's address can be readily determined by DNS. However, this approach requires users of both SIP and e-mail services to be allocated different and potentially confusing SIP and e-mail addresses. This exacerbates the problem of address memory, address book maintenance and in particular, address resolution using database queries. A further problem associated with SIP is that as a newly implemented protocol there is no delivery guarantee, that is to say delivery of a SIP message addressed using a SIP URL may fail, for instance because the intended recipient is not enabled to receive SIP messages.

BRIEF SUMMARY

According to an aspect of the present invention there is provided a method for processing control messages constructed in accordance with a first communications protocol for use in a communications network, each control message including a first address identifier having a format defined by said first protocol; said method comprising the steps of:

i) processing said control message to derive a second address identifier from said first identifier, said second identifier having a format defined by a second communications protocol; and, ii) re-formatting said control message for transmission, in accordance with said second protocol, to a network system associated with said second address identifier.

In this way, a control message constructed in accordance with a first network protocol can be readily converted for transmission over a second network protocol to a network system having an network address identifier constructed in accordance with the second protocol. The integration of new communications services implemented over a new protocol can be improved with the above method. For instance, a control message-constructed in accordance with a newly implemented communications protocol can be readily converted for transmission to a network address associated with a communications service provided over a widely implemented protocol where the address corresponds to an intended destination address associated with a new communications service provided over the newly implemented protocol. For instance, if a message is sent but not delivered to a user or location identified by an address identifier associated with a newly implemented protocol, the address identifier can be resolved back to an address identifier associated with a widely implemented protocol and the message sent to the location associated with that resolved address by means of a service available over the widely implemented communications protocol. This may be necessary, for instance, if the network system associated with the original address identifier is not capable of receiving control messages constructed in accordance with the newly implemented protocol. A further advantage of the above method is that users can readily address messages etc, for transmission over one communications protocol using an address identifier associated with another communication protocol. The ability to make use of the address space associated with a widely implemented communications protocol is very important when say new services are to be introduced using a new protocol. For example, a user may address a message to another user using a new address identifier derived from a known identifier regardless of whether the user is aware of the recipient's address identifier for the newly introduced protocol or whether the recipient has indeed been allocated a new address identifier or is capable of receiving the message over the new protocol. In the context of the present invention it is to be understood that all or part of the control message may be re-formatted for transmission over the second protocol. For instance, the address identifier only may be re-formatted and the remainder of the message discarded.

Preferably, a control message is processed in accordance with steps i) and ii) in response to a detected delivery failure of said control message to a network system associated with said first address identifier. In this way if a control message fails to be delivered using a communication service provided over one protocol, say a newly implemented protocol, the message can be processed according to the above method for delivery over another communications protocol, for example a widely implemented protocol.

Conveniently, said control message is processed in response to said first address identifier being identified as an invalid address identifier. In this way a control message having invalid destination address identifier can be processed for transmission by means of a service implemented over another protocol to a valid network address recognised by that protocol.

In preferred embodiments, said control message is processed in response to said network system associated with said first address identifier failing to respond to said message. This allows control messages to be processed for delivery by another communications service when the intended destination network system is unavailable or unwilling to receive control messages delivered in accordance with one network protocol but available or willing to accept messages delivered in accordance with another network protocol.

Preferably, said method further comprises the step of selecting a pre-determined error message for transmission to said network device associated with said second address in accordance with a respective failure mode associated with said detected control message delivery failure. In this way a destination end user or end system can be informed of a detected delivery failure.

Conveniently, said method further comprises the step of linking said control message to said pre-determined message for transmission to said network device associated with said second address identifier. In this way data contained in the control message can be made available to the intended recipient in such a way that pre-determined message templates can be used for message construction.

In preferred embodiments, said pre-determined message comprises executable code, or an network address identifier for accessing executable code, wherein said code is capable of processing said control message in accordance with said first protocol. In this way end systems or users can readily access software programs for receiving communications services provided over a newly implemented protocol.

Preferably, said pre-determined message comprises a pre-defined data structure for registering said first address identifier with an address database associated with said first protocol. In this way end systems or users can readily register an address identifier for receiving communications services provided over a newly implemented protocol.

Conveniently, said first address identifier comprises at least one address component and said step of processing said message comprises constructing said second address identifier to include at least one component of said first address. In this way address components can be common to both first and second address identifiers.

In preferred embodiments, said second address identifier is contained in said first address identifier and said method comprises the step of parsing said control message to identify said first address identifier and determine said second address identifier from said first address identifier. This enables the second address identifier to be readily derivable from the first address identifier.

Preferably, said first protocol is an application layer control protocol. This provides for the implementation of user applications and new communications services.

Conveniently, said application layer control protocol conforms to Session Initiation Protocol In preferred embodiments, said second protocol is an application layer protocol.

Preferably, said second protocol conforms to an Internet mail transfer protocol.

Thus, SIP messages can be addressed to an existing address identifier, for example and e-mail address identifier constructed in accordance with Simple Mail Transfer Protocol (SMTP), and translated to a corresponding SIP address identifier for transmission to a SIP user agent server regardless of whether the SIP address identifier is known to the user. Thus, the present invention enables messages to be readily diverted from a SIP defined destination URL address identifier to a corresponding SMTP defined destination URL address identifier for the same user or end system. In this way users may send SIP messages to SMTP address identifiers using the SMTP network protocol and infrastructure and SMTP messages to SIP address identifiers using the SIP network protocol and infrastructure.

According to another aspect of the invention there is provided a software program for implementing said method.

According to a further aspect of the invention there is provided a system for processing control messages constructed in accordance with a first communications protocol for use in a communications network, each control message including a first address identifier having a format defined by said first protocol; said system comprising:

a processor for processing said control message to derive a second address identifier from said first identifier, said second identifier having a format defined by a second communications protocol; and, a message constructor for re-formatting said control message for transmission, in accordance with said second protocol, to a network device associated with said second address identifier.

BRIEF DESCRIPTION OF THE DRAINGS

The invention will now be described with reference to the accompanying drawings in which.

DETAILED DESCRIPTION OF EXEMPLARY EMBODIMENTS

Figure 1A:
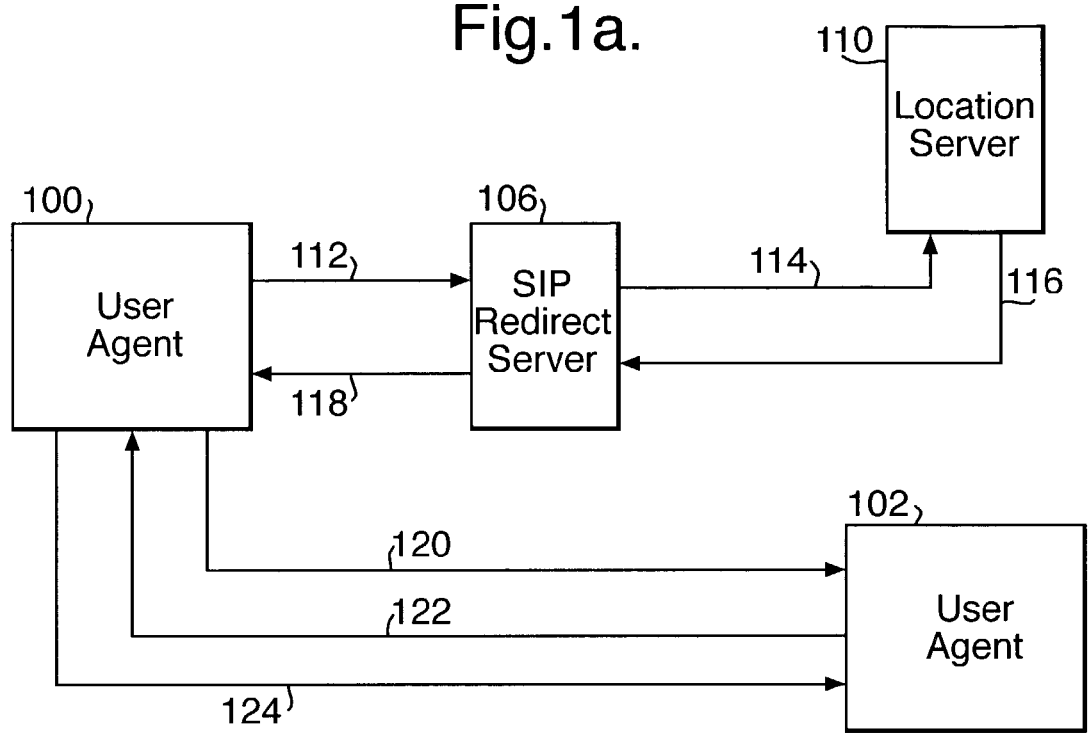
FIG. 1a is a schematic representation of a typical SIP message signalling sequence in a network comprising a SIP re-direct server.
Figure 1B:
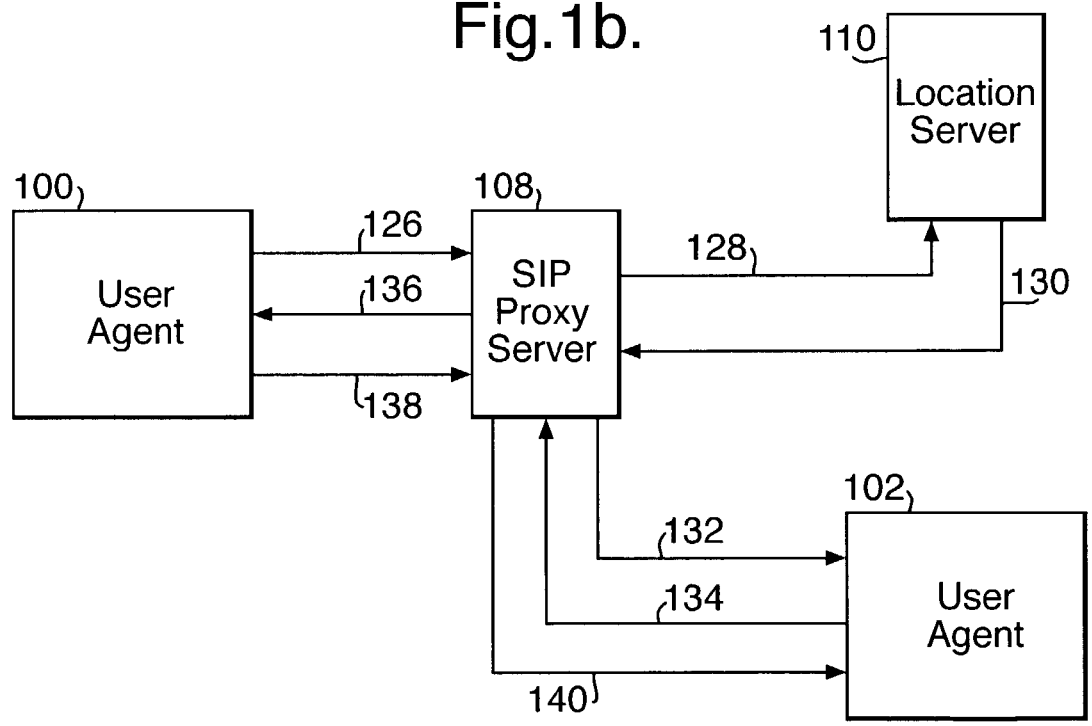
FIG. 1b is a schematic representation of a typical SIP message signalling sequence in a network comprising a SIP proxy server.

With reference to the drawings, typical signalling sequences are shown in FIGS. 1a and 1b between two user agents 100 and 102 connected over a communications network using a SIP redirect server 106 (FIG. 1a), and a SIP proxy server 108 (FIG. 1b). In both arrangements a SIP location server 110 is connected to the respective SIP network server for address resolution.

In FIG. 1a, user agent 100 sends a SIP Invite message 112 to user agent 102. The Invite message is received at and processed by the re-direct server 106 to determine the network location of user agent 102. The re-direct server sends a location query 114 to the location server 110. The location server determines the current network location of user agent 102 and sends this information to the re-direct server in a message 116 for transmission to the user agent 100 in a message 118. User agent 100 then sends an Invite message 120 to user agent 102, either directly or via other SIP re-direct or proxy servers, which then responds by sending an acceptance message 122 to the user agent 100. User agent 100 completes the session or call set up procedure by sending an acknowledgement 124. Once the session has been set up information can be exchanged between the respective user agents.

In FIG. 1b, user agent 100 sends a SIP Invite message 126 to user agent 102 as before but instead of being processed by a re-direct server the message is processed by the network proxy server 108. The proxy server sends a location query 128 to the location server 110. The location server determines the current network location of the user agent 102 and sends this information back to the proxy server in a message 130. The proxy server then relays the Invite message to the user agent 102 by means of a message 132 which is processed by the user agent 102. A call acceptance message 134 is then sent back to the proxy server which relays a corresponding message 136 to the user agent 100. The user agent 100 then sends an acknowledgement message 138 to the proxy server which similarly relays a corresponding message 140 to the user agent 102.

Figure 2:
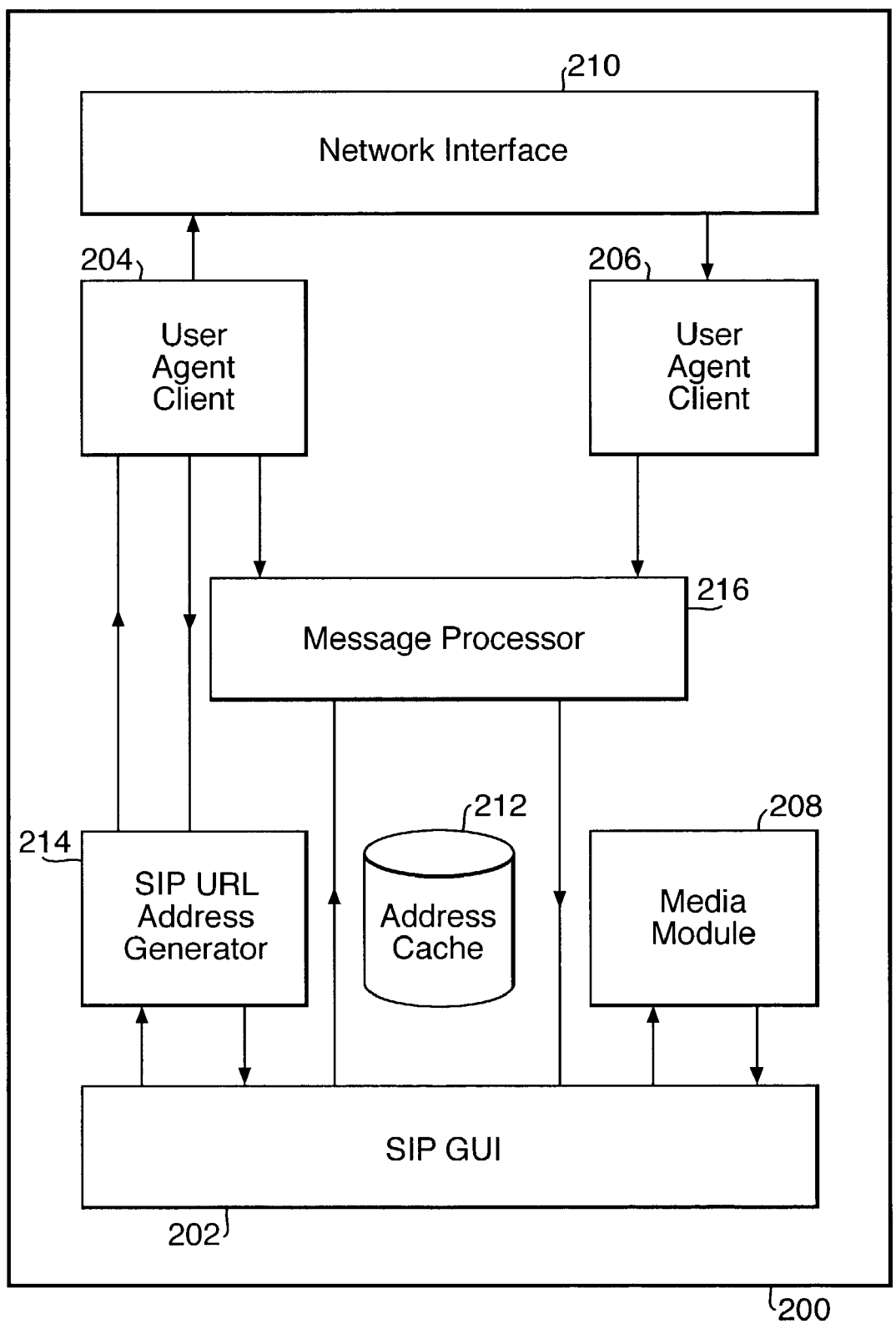
FIG. 2 is a block diagram of a SIP user agent.

With reference now to FIG. 2, a typical SIP user agent 200 comprises a front end system in the form of a graphical user interface (GUI) 202, a SIP client program 204, a SIP server program 206, a media module 208, a network interface 210 a SIP address cache 212, a SIP URL address generator 214 and a SIP message processor 216.

Figure 3:
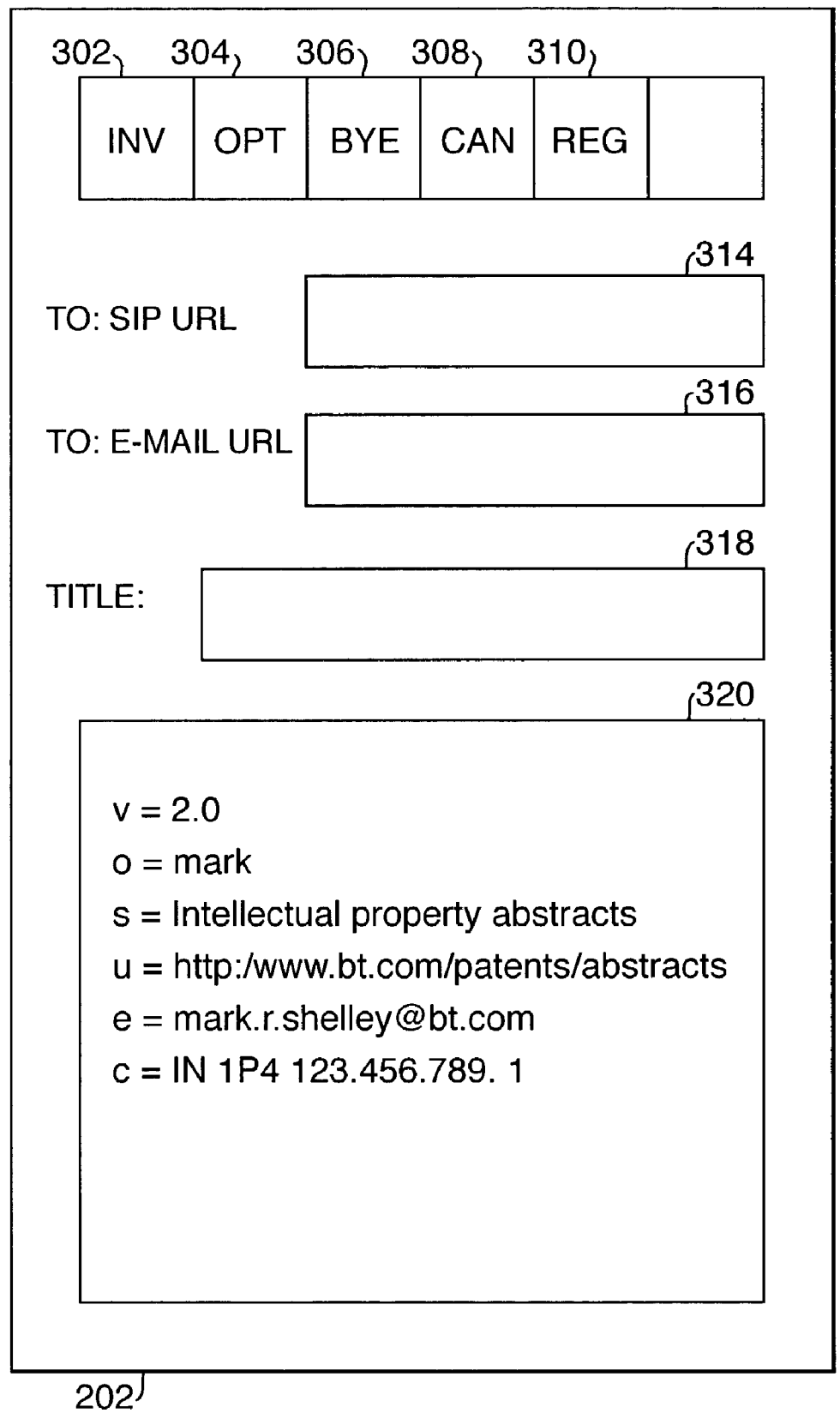
FIG. 3 is a block diagram of a SIP user agent graphical user interface.

A typical SIP GUI is shown in FIG. 3. The GUI 202 comprises a plurality of buttons 302 to 310 each of which represents a different SIP request method. Button 302 represents the SIP "INVITE" request for inviting a callee to a SIP session, button 304 represents the "OPTIONS" request for discovering the capabilities of the receiving terminal, button 306 represents the "BYE" request for terminating a call or a call request, button 308 represents the "CANCEL" request for terminating incomplete call requests and button 310 represents the "REGISTER" request method for registering the current location of the user with a respective domain location database 110. The respective request methods are invoked by a user clicking the respective button, by mouse controlled cursor click or otherwise. The GUI further comprises a text box 314 labelled "To: SIP URL" for user input, by keyboard entry or address book entry selection for example, of the SIP address identifier of an intended callee, that is to say the SIP destination message header field "To"; a text box 316 labelled "To: e-mail URL" for user input of the e-mail address identifier of the intended callee; and, a text box 318 labelled "Title" for displaying title information to identify the session. A further text box 320 is provided for the input of other SIP message text including for example other SIP header types and text comprising the SIP message body. Text may be input into any one of the text boxes 314, 316, 318, 320 using known text processing means, for example, keyboard entry, selection from pull down menus or cut and paste text processing applications.

The SIP message constructor is configured to process data entered into any one of the boxes 314, 316, 320, 320 and construct a SIP message including the relevant request type for transmission to an appropriate SIP network server. For example, the message constructor copies the text entered in the text box 314 to the SIP message header type "To:" in the SIP message being constructed. Other header types are determined by the message constructor such as "Content-type:" and "Content length:" for example.

The user agent client program is configured to initiate a SIP session or "call" and the user agent server program is configured to respond to a call. In this regard the user agent client program implements the SIP request methods Invite, Options, Bye, Cancel and Register, and the user agent server implements the methods Invite, Bye, Cancel and Ack methods. Messages are passed from the user agent client to the network interface 210 for transmission to the intended callee associated with the destination SIP URL address. SIP messages are received at the destination end by the network interface and are processing by the user agent server. The media module 208 provides the necessary API's for sending system calls to appropriate media applications for processing different media types once a SIP session has been established.

When a user wishes to initiate a SIP session, the user interacts with the GUI 202 to construct a SIP Invite message including a destination SIP or e-mail address. Once all the necessary data has been input to the GUI, including the SIP header types and message body, the message processor constructs an appropriate SIP message for transmission to the callee. In the event that the callee's SIP URL address is unknown to the user, the user inputs the callee's SMTP e-mail address in the text box 316. The e-mail address is then sent to the SIP URL generator 214.

The SIP URL generator 214 comprises a software program for generating a SIP URL address identifier from a respective SMTP e-mail address identifier for a respective user.

The SIP URL generator is configured to process the e-mail address identifier, in accordance with a set of pre-determined rules, to generate a corresponding SIP URL address identifier for the callee. In one arrangement, the e-mail address is processed by the SIP URL generator which adds a prefix address component to the existing e-mail address components "user@host" etc. The prefix address component identifies the communications protocol that the new URL is to be used with. In this embodiment "sip" is added as a prefix. A suffix address component is also added to identify a SIP domain name authority the newly generated SIP URL address identifier is to be identified with. In one example the SIP URL generator is configured to process the SMTP e-mail address "alan.oneill@bt.com" to derive the SIP URL address identifier "sip:alan.oneill@bt.com.sipit.com", that is to say, to add the protocol prefix "sip" and the domain suffix "sipit.com" to the existing SMTP readable e-mail address "alan.oneill@bt.com". Thus, the SIP URL generator is configured to generate SIP URL address identifiers by processing a respective address identifier constructed in accordance with the Internet e-mail communications protocol SMTP. In another example the SIP URL generator is configured to process the same SMTP e-mail address identifier to derive the SIP URL address identifier "sip:alan.oneill@bt.com.uk.sipit.com", that is to say a geographical identifier "uk" is additionally added to the SMTP e-mail address identifier. The additional geographic identifier may assist scalability of the name space and hence network routing efficiency of the resulting SIP message, for example.

Figure 4:
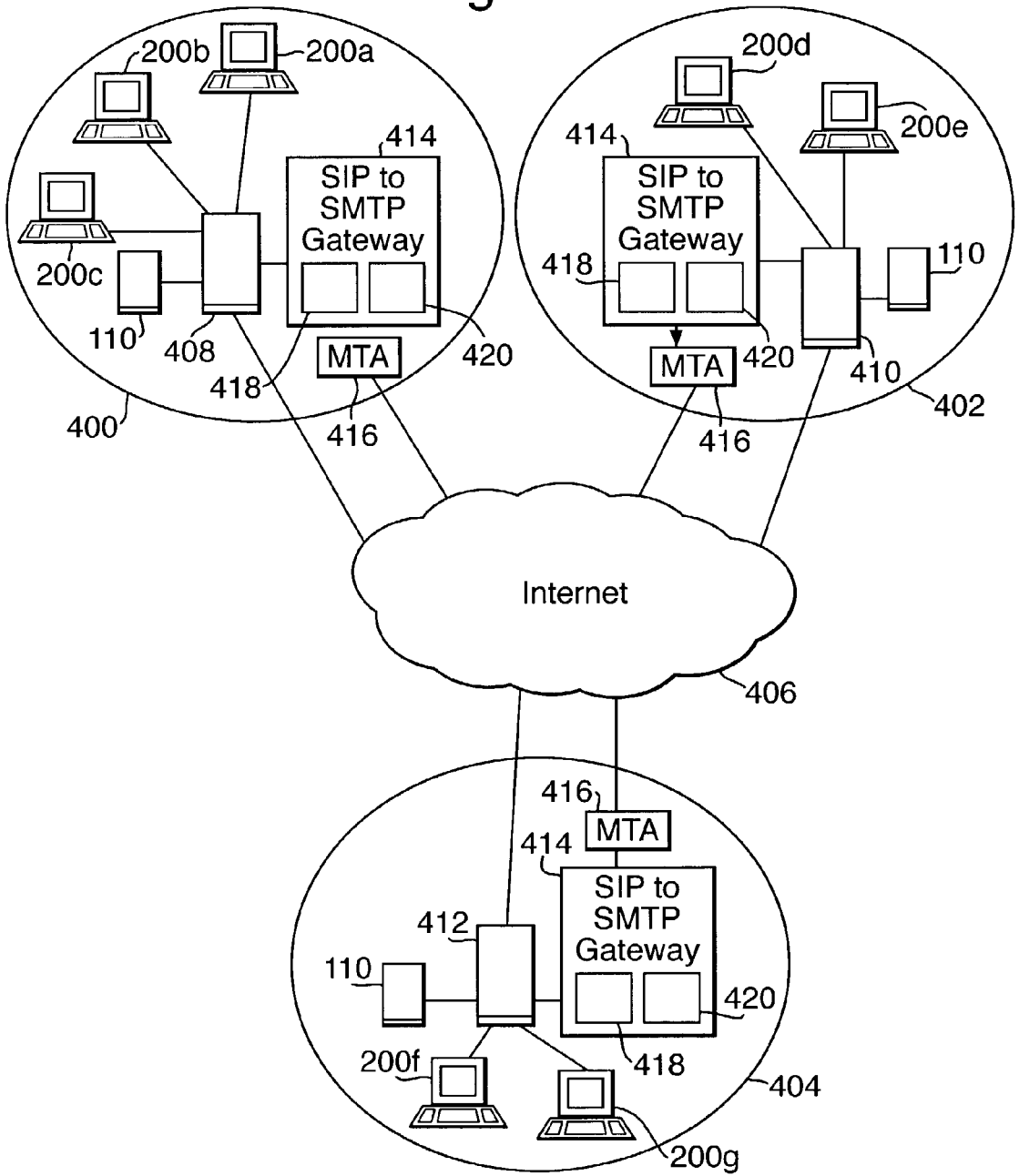
FIG. 4 is a schematic representation of a communications network comprising a plurality of SIP enabled network domains; and, FIG. 5 is a flow diagram of a method implemented in the communications network of FIG. 4.

Referring now to FIG. 4, a plurality of network domains 400, 402 and 404 are each connected to the Internet 406 by means of a respective SIP network server 408, 410 and 412. In the network of FIG. 4 the SIP network servers are configured for use both as SIP proxy and SIP re-direct servers. The SIP network servers provide access to and from the respective domains. Each network domain comprises a plurality of SIP user agents 200(a–g). SIP user agents 200a, 200b and 200c are connected to the network server 408 in the domain 400, SIP user agents 200d, and 200e are connected to the network server 410 in the domain 402, and SIP user agents 200f and 200g are connected to the network server 412 in the domain 404. Each SIP network server is connected to a respective location server 110 for SIP address resolution and an associated SIP to SMTP e-mail gateway 414. Each SMTP e-mail gateway is connected to a respective SMTP Mail Transfer Agent (MTA) 416 for relaying SMTP e-mail messages to respective destination SMTP MTA's over transport layer TCP connections.

Each SIP to SMTP e-mail gateway 414 comprises an SMTP e-mail address generator 418 and a message processor 420 which comprises an SMTP user agent. The e-mail address generator comprises software for generating an SMTP address identifier from a SIP URL address identifier.

In this regard the e-mail address generator is configured in a similar but reverse manner to the address generator 214. The e-mail address generator is configured to process the SIP URL destination address identifier of an out going SIP message to derive a corresponding SMTP e-mail address identifier. The e-mail address generator processes the SIP URL address in accordance with the same pre-determined set of rules as the SIP address generator 214, but processes these rules in reverse order with respect to the address generator 214. For instance, in one embodiment a SIP message arriving at the SIP to SMTP e-mail gateway 414 is parsed to determine the destination SIP URL. The SIP URL is then passed to the SIP to e-mail address generator 418. The remaining part of the SIP message is re-formatted by the message processor 420 into SMTP format suitable for transmission as an SMTP e-mail message.

In one embodiment the address generator 418 is programmed in accordance with the above set of rules, that is to say to remove the protocol identifier prefix "sip" from the SIP URL address and to remove the sip domain suffix component "sipit.com". The address generator sends the re-formatted SMTP address identifier to the message processor where the newly derived SMTP address is added to the re-formatted message as the destination SMTP address for that message. The message processor adds the newly generated SMTP address to the SMTP "To:" header field of a respective SMTP message. For example, the address generator 418 is programmed to derive the SMTP e-mail address identifier alan.oneill@bt.com from SIP URL "sip: alan.oneill@bt.com.sipit.com".

The message processor 420 constructs an appropriate SMTP message for transmission to the newly generated SMTP address according to the content of the respective SIP control message. For example, the SIP message payload, for example the SDP message component of the SIP message, is added as text to the respective SMTP message body for transmission to the respective destination SMTP address. In the example described with reference to FIG. 3, the SDP text shown in box 320 is processed and added as text to the SMPT message payload by the message processor 420.

Figure 5:
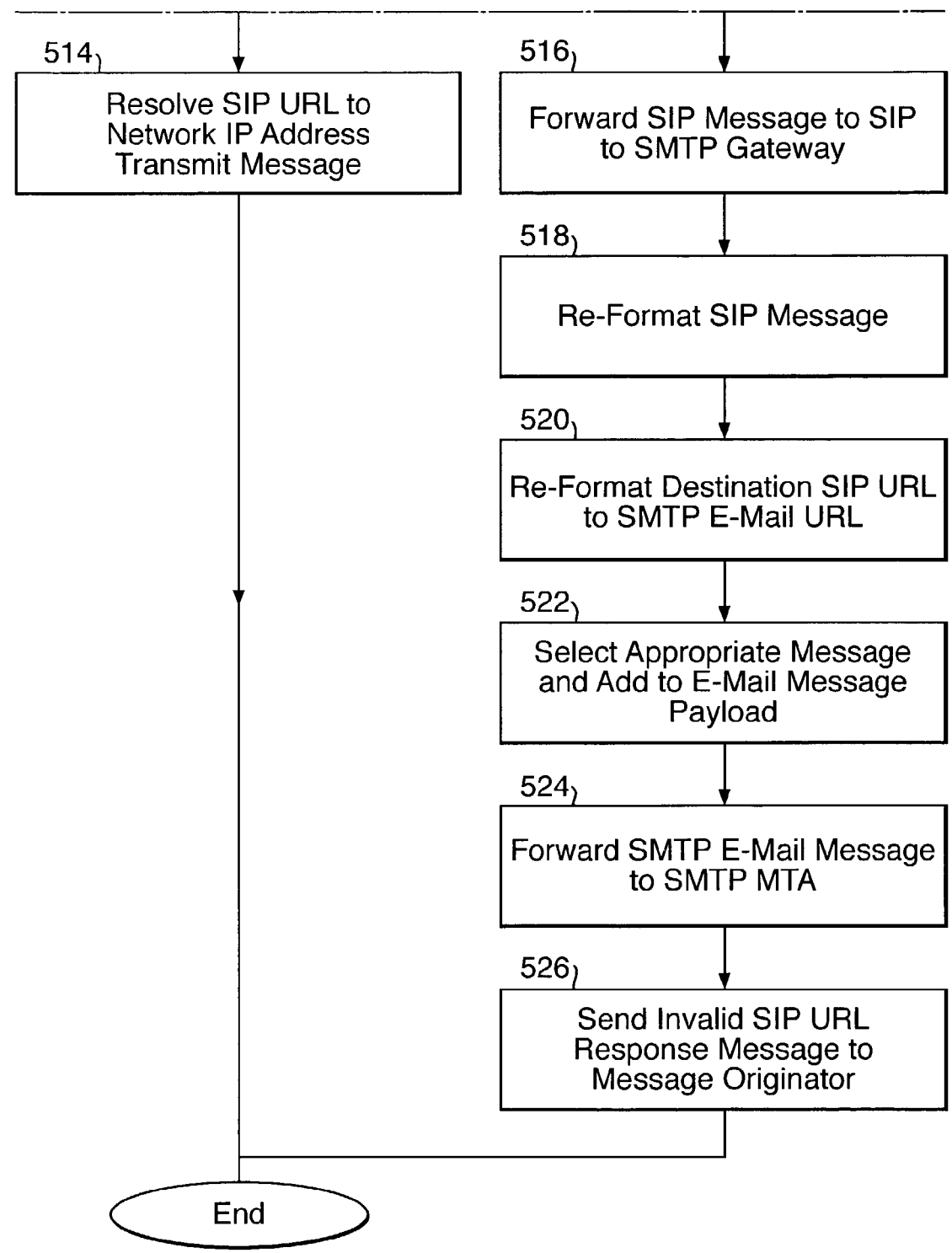

With reference now to the flow diagram of FIG. 5, a user initiates a SIP session in step 500 by interaction with the GUI 202 of a SIP user agent 200. A data entry for each of the required data types is input by the user including a destination SIP address in box 314 or, in the absence of a known SIP URL for the intended recipient, an SMTP e-mail address that is known to be allocated to the recipient in box 316. Data relating to the SIP message is processed into SIP format by the SIP message processor 216 and is then submitted to the user agent client 204 by the user selecting the Invite button 302 by mouse click or other data input command. The user agent client determines in step 502 whether a SIP URL address has been provided or an SMTP e-mail address. If a SIP URL has been provided processing proceeds to step 508. However, if an SMTP e-mail address identifier has been provided the user agent client sends the e-mail address to the address generator 214 for processing to a respective SIP URL address identifier in step 504. A respective SIP URL is generated in accordance with the above described method. In step 506 the newly derived SIP URL address is added to the SIP destination header type "To:" following the INVITE request type of the SIP message.

The SIP message is transmitted to the appropriate local SIP network server 408,410 or 412 in step 508 to be relayed or re-directed to a network server associated with the destination SIP URL address. The network server that receives the SIP message queries its associated location database 110 in step 510, using DNS or other address resolution means, to determine the network server the SIP message should be transmitted to. In step 512 a network server having authority for the domain for the destination SIP URL determines whether the destination SIP URL address is a valid network address, that is to say, whether the SIP URL address has been allocated by the domain authority to a SIP user. The SIP URL destination address is a valid network address if it can be resolved by a location database using DNS or other resolution means to a respective numerical IP address, for example. In this respect address resolution may involve querying other location databases associated with other network SIP servers or SIP domains in a similar way that DNS resolves numerical IP addresses. In step 514, if the destination SIP URL address is valid, that is to say it has been allocated to a respective user and can be resolved, the location server returns the IP address of the next SIP server that is configured to relay or re-direct the message or if appropriate the IP address of the end system currently associated with the destination SIP URL. The SIP message is sent to the next SIP network server or destination end system in step 516. If the SIP URL is invalid, that is to say it has not been allocated by the appropriate domain authority for use in the network, an appropriate SIP network server transmits the SIP message to an associated SIP to SMTP e-mail gateway in step 516. The destination SIP URL may be invalid for instance because it was automatically generated from a known e-mail address identifier in step 504 and no corresponding SIP address exists. Under these circumstances the message processor 420 re-formats the SIP message to an SMTP message for communication over the Internet 406 in accordance with SMTP in step 518. In step 520 the destination SIP URL address is processed by the address generator 418 in step 520 to derive the SMTP e-mail address encapsulated within the SIP URL address. Additional information and data is added to the re-formatted SMTP e-mail message in step 522 including, for example the text:

"You were called by SIP user <sender's SIP URL and associated data> at <time, date> with message <SIP message body content (SDP) > but you were not found in the SIP registration system. You can register at <http hyperlink> where you can download a SIP client."

or,

"You were called by SIP user <sender's SIP URL and associated data> at <time, date> with message <SIP message body content (SDP)> but you were not found in the SIP registration system. You can register using the attached http form <http registration form with mailto: URI address>. A SIP client <SIP client executable code> is attached."

The SMTP message is sent to an associated mail transfer agent 416 in step 524 for transmission to the e-mail address derived in step 520 using the SMTP network protocol. In step 526 the sender is informed by the SIP server that the destination SIP URL was not valid and that the message was instead re-formatted according to SMTP and sent to the SMTP e-mail address derived in step 520.

It will be seen that the other embodiments of the present invention could be readily implemented by the skilled person, for instance instead of the SIP message being diverted to a SIP to e-mail gateway in the event that the destination SIP URL address is invalid, a SIP message could be readily diverted to a SIP to e-mail gateway if the user or the end system associated with the user was unavailable or unwilling to receive SIP messages at the time of message transmission. In one embodiment, the respective SIP server selects an appropriate message from an associated message library (not shown) for inclusion with the original SIP message in step 522. The message library includes a respective delivery failure message for each SIP message delivery failure mode, including for example, destination SIP user agent unavailable, user unavailable, network connection failure, user unwilling to join SIP session or user unwilling to join designated sessions, user will be available at <time, date>, etc.

It will also be seen that in other embodiments the SIP to e-mail gateway 414 could be readily implemented in other network devices such as a respective network SIP server or a SIP user agent.

What is claimed is:

1. A method for processing control messages constructed in accordance with a communication signalling protocol for use in a communications network, each control message including a first address identifier formatted for use in said signalling protocol; said method comprising:
   i) determining if said first address identifier is a valid address identifier that can be used to deliver said control message and (a) if it is determined that said first address identifier is valid, then proceeding to deliver said control message using said first address identifier but (b) if it is determined that said first address identifier is not valid, then processing said control message to derive a second address identifier from said first identifier, said second identifier having a format defined by a data transfer protocol; and,
   ii) if said second address identifier is derived from step (i)(b), then re-formatting said processed control message for transmission, in accordance with said data transfer protocol, to a network system associated with said second address identifier.

2. A method according to claim 1, wherein said determination of first address validity is made in response to said network system associated with said first address identifier failing to respond to said message.

3. A method according to claim 1 further comprising:
   if said second address identifier is derived, selecting a pre-determined error message for transmission to the intended recipient of said message using said second address in accordance with a respective failure mode associated with said detected control message delivery failure.

4. A method according to claim 3 further comprising:
   linking said control message to said pre-determined message for transmission to. said intended message recipient associated with said second address identifier.

5. A method according to claim 3 wherein said pre-determined message comprises executable code, or an network address identifier for accessing executable code, wherein said code is capable of processing said control message in accordance with said signalling protocol.

6. A method according to claim 3 wherein said pre-determined message comprises a pre-defined data structure for registering said first address identifier with an address database associated with said signalling protocol.

7. A method according to claim 1 wherein said first address identifier comprises at least one address component and said step of processing said message comprises constructing said second address identifier to include at least one component of said first address.

8. A method to claim 7 wherein said second identifier is contained in said first address identifier and said method comprises the step of parsing said control message to identify said first address identifier and determine said second address identifier from said first address identifier.

9. A method according to claim 8 wherein said application layer control protocol conforms to Session Initiation Protocol.

10. A method according to claim 1 wherein said signalling protocol is an application layer control protocol.

11. A method according to claim 1 wherein said data transfer protocol is an application layer protocol.

12. A method according to claim 1 wherein said data transfer protocol conforms to an Internet mail transfer protocol.

13. A tangible computer readable medium containing a software program for implementing a method according to claim 1.

14. A system for processing control messages constructed in accordance with a first communications protocol for use in a communications network, each control message including a first address identifier having a format defined by said signalling protocol; said system comprising:

a processor for processing said control message to determine if said first address identifier is a valid address identifier that can be used to deliver said control message and (a) if it is determined that said first address identifier is valid, then proceeding to deliver said control message using said first address identifier but (b) if it is determined that said first address identifier is not valid, then deriving a second address identifier from said first identifier, said second identifier having a format defined by a second communications protocol; and a message constructor for re-formatting said processed control message for transmission if said second address identifier is derived, then, in accordance with said data transfer protocol, to a network device associated with said second address identifier.

* * * * *